(12) United States Patent
Guo et al.

(10) Patent No.: US 6,714,426 B1
(45) Date of Patent: Mar. 30, 2004

(54) MULTIPLE-PHASE, MULTI-MODULE POWER SUPPLY SYSTEM FOR HIGH FREQUENCY OPERATION

(75) Inventors: Yigang Guo, Cupertino, CA (US); Eric Yang, Saratoga, CA (US)

(73) Assignee: Semtech Corporation, Camarillo, CA (US)

( * ) Notice: Subject to any disclaimer, the term of this patent is extended or adjusted under 35 U.S.C. 154(b) by 0 days.

(21) Appl. No.: 10/287,215

(22) Filed: Nov. 4, 2002

(51) Int. Cl.[7] .............................................. H02M 3/337
(52) U.S. Cl. ............................ 363/25; 363/17; 363/134
(58) Field of Search ............................. 363/16, 17, 24, 363/25, 97, 133, 134

(56) References Cited

U.S. PATENT DOCUMENTS

| | | | | |
|---|---|---|---|---|
| 5,177,675 A | * | 1/1993 | Archer | 363/25 |
| 5,903,448 A | * | 5/1999 | Davila, Jr. | 363/24 |
| 5,969,955 A | * | 10/1999 | Laskai et al. | 363/25 |
| 6,466,457 B1 | * | 10/2002 | Wiseman | 363/16 |
| 6,590,791 B1 | * | 7/2003 | Zhou et al. | 363/25 |

* cited by examiner

Primary Examiner—Bao Q. Vu
(74) Attorney, Agent, or Firm—O'Melveny & Myers LLP

(57) ABSTRACT

A multiple-phase power converter comprises a non-isolated, double-ended transformer having a plurality of windings, a high-side switch portion, a low-side switch portion, an output portion, and a controller. The high-side switch portion includes a first power switch connecting an input voltage source ($V_{IN}$) to a virtual phase node through a first winding of the plurality of windings and a second power switch connecting the input voltage source to the virtual phase node through a second winding of the plurality of windings. The first and second windings are arranged with opposite polarity. The low-side switch portion includes a third power switch connecting the virtual phase node to ground through a third winding of the plurality of windings and a fourth power switch connecting the virtual phase node to ground through a fourth winding of the plurality of windings. The third and fourth windings are arranged with opposite polarity. The output portion includes an output inductor connecting the virtual phase node to an output terminal providing an output voltage ($V_{OUT}$). The controller is adapted to control operations of the first, second, third and fourth power switches such that the first and second power switches are enabled in respective alternating phases. The third switch is disabled when the second switch is enabled so that current flows concurrently through both the second and fourth windings to the output inductor during a first phase, and the fourth switch is disabled when the first switch is enabled so that current flows concurrently through the first and third windings to the output inductor.

20 Claims, 5 Drawing Sheets

MULTIPLE-PHASE, MULTI-MODULE POWER SUPPLY SYSTEM FOR HIGH FREQUENCY OPERATION

BACKGROUND OF THE INVENTION

1. Field of the Invention

The present invention relates to voltage regulator circuits. More particularly, the invention relates to a multi-phase power converter that can operate at high switching frequencies with effective ripple cancellation and reduced switching loss.

2. Description of Related Art

Switched mode DC-to-DC power converters are commonly used in the electronics industry to convert an available direct current (DC) level voltage to another DC level voltage. A switched mode converter provides a regulated DC output voltage to a load by selectively storing energy in an output inductor coupled to the load by switching the flow of current into the output inductor. A synchronous buck converter is a particular type of switched mode converter that uses two power switches, typically MOSFET transistors, to control the flow of current in the output inductor. A high-side switch selectively couples the inductor to a first power supply voltage while a low-side switch selectively couples the inductor to a second power supply voltage, such as ground. A filter capacitor coupled in parallel with the load reduces ripple of the output current. A pulse width modulation (PWM) control circuit is used to control the gating of the high-side and low-side switches in an alternating manner. Synchronous buck converters generally offer high efficiency and high power density, particularly when MOSFET devices are used due to their relatively low on-resistance.

For certain applications having demanding current requirements, it is known to combine plural synchronous buck converter modules together in multi-phase configurations operated in an interleaf mode. The output inductors of each of the buck converter modules are connected together to provide a single output voltage. The PWM control circuit provides a variable duty cycle control signal to each buck converter module in order to control its switching. The multiple modules are operated in a synchronous manner, with the respective high-side switches of each channel being switched on at different phases of a power cycle. Interleaf operation is advantageous in that it reduces the current ripple across the filter capacitor and makes the ripple frequency a multiple of the switching frequency, thereby enabling the use of smaller filter capacitors to reduce the ripple. Also, by spreading the output current among the multiple channels, the thermal load on the power semiconductor components of the power converter is reduced.

Recent advancements in microprocessors continue to drive a demand for power converters that supply increasingly low output voltages (e.g., less than 1.5 volts) at high load current (e.g., greater than 40 amps). To satisfy this demand, multi-phase power converters are operated at very high switching frequencies (e.g., greater than 100 kHz). But, at high switching frequencies, as the duty cycle is made very small (e.g., 10–40%), multi-phase power converters tend to exhibit poor ripple cancellation. Moreover, the high-side MOSFET devices have high switching losses due to the high switching voltage and current. To solve these problems, power converter topologies that utilize groups of coupled magnetic configurations have been proposed, such as the coupled buck converter and the tapped inductor buck converter. These topologies extend the power converter duty cycle, and have better ripple cancellation and lower switching losses due to lower switching current.

Nevertheless, these coupled magnetic topologies also have other drawbacks that make them less attractive as alternative designs. Coupled magnetic configurations are not functionally equivalent to buck converters, and operate analogously to flyback converter topologies in that the load current is partly supplied by the filter capacitor during the on-time of the power switches, hence requiring a larger filter capacitor. Further, coupled magnetic configurations have stability problems due to a right half plane zero that introduces an extra phase-shift of 90° into the control loop. Coupled magnetic configurations also have poor efficiency and large output ripple due to their discontinuous energy transfer to the output inductor. Lastly, coupled magnetic configurations use a single ended inductor in which the magnetic flux swing is unidirectional. This results in poor utilization of the transformer core since the core flux must reset naturally. In addition to these drawbacks, the relationship between the inductor turns ratio and duty cycle is not linear, so the duty cycle cannot be increased proportionally with the inductor turns ratio.

Accordingly, it would be desirable to provide a multi-phase power converter that can operate at high switching frequencies with effective ripple cancellation and reduced switching loss for high power density converter applications. It would also be desirable to provide such a multi-phase power converter having a simple, true buck-derived topology.

SUMMARY OF THE INVENTION

The present invention overcomes these drawbacks of the prior art by providing a multi-phase power converter that can operate at high switching frequencies with effective ripple cancellation and reduced switching loss for high power density converter applications.

In an embodiment of the invention, the multiple-phase power converter comprises a non-isolated, double-ended transformer having a plurality of windings, a high-side switch portion, a low-side switch portion, an output portion, and a controller. The high-side switch portion includes a first power switch connecting an input voltage source ($V_{IN}$) to a virtual phase node through a first winding of the plurality of windings and a second power switch connecting the input voltage source to the virtual phase node through a second winding of the plurality of windings. The first and second windings are arranged with opposite polarity. The low-side switch portion includes a third power switch connecting the virtual phase node to ground through a third winding of the plurality of windings and a fourth power switch connecting the virtual phase node to ground through a fourth winding of the plurality of windings. The third and fourth windings are arranged with opposite polarity. The output portion includes an output inductor connecting the virtual phase node to an output terminal providing an output voltage ($V_{OUT}$).

The controller is adapted to control operations of the first, second, third and fourth power switches such that the first and second power switches are enabled in respective alternating phases. The third switch is disabled when the second switch is enabled so that current flows concurrently through both the second and fourth windings to the output inductor during a first phase, and the fourth switch is disabled when the first switch is enabled so that current flows concurrently through the first and third windings to the output inductor. In a preferred embodiment, the first and second power switches are driven by respective control signals having a duty cycle of approximately 25% and a relative phase difference of 180°. Likewise, the third and fourth power switches are driven by respective control signals having a duty cycle of approximately 75% and a relative phase difference of 180°.

The multiple-phase power converter may further include a snubber circuit electrically connected to the high-side portion to reduce voltage ringing or spikes due to leakage inductance of the double-ended transformer. The snubber circuit may further comprise a low pass filter electrically connected to the first and second power switches. Alternatively, the snubber circuit may comprise a diode and a parallel-connected resistor and capacitor connected electrically between each of the first and second power switch or across each of the first and second winding. The multiple-phase power converter may further comprise a capacitor electrically connected between the first and second power switches to provide clamping of the high-side portion.

In another embodiment of the invention, the multiple-phase power converter is adapted for four-phase operation, and comprises a non-isolated, double-ended transformer having a plurality of windings, a first high-side switch portion, a first low-side switch portion, a first output portion, a second high-side switch portion, a second low-side switch portion, a second output portion and a controller. The first, second, fifth and sixth power switches are driven by respective control signals having a duty cycle of approximately 25% and a relative phase difference of 90°. The third, fourth, seventh and eighth power switches are driven by respective control signals having a duty cycle of approximately 75% and a relative phase difference of 90°.

A more complete understanding of the multi-phase power converter will be afforded to those skilled in the art, as well as a realization of additional advantages and objects thereof, by a consideration of the following detailed description of the preferred embodiment. Reference will be made to the appended sheets of drawings that will first be described briefly.

DETAILED DESCRIPTION OF THE PREFERRED EMBODIMENT

The present invention satisfies the need for a multi-phase power converter that can operate at high switching frequencies with effective ripple cancellation and reduced switching loss for high power density converter applications. In the detailed description that follows, like element numerals are used to describe like elements illustrated in one or more of the figures.

Figure 1:
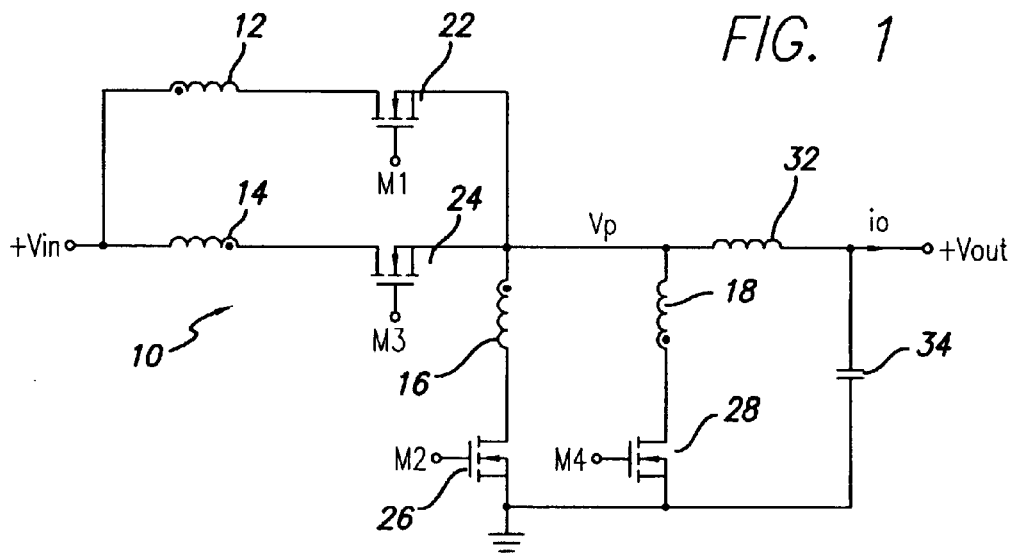
FIG. 1 is a schematic diagram of a two-phase DC-to-DC power converter in accordance with an embodiment of the invention.

Referring first to FIG. 1, a two-phase DC-to-DC power converter 10 is illustrated in accordance with an embodiment of the invention. The DC-to-DC power converter 10 receives an input voltage ($V_{IN}$) and provides an output voltage ($V_{OUT}$) and output current ($i_O$) to a load (not shown). A capacitor 34 is electrically connected in parallel with the load to provide smoothing of the output voltage $V_{OUT}$. The power converter 10 includes a pair of high-side power switches 22, 24 and a pair of low-side power switches 26, 28. The high-side power switches 22, 24 and the low-side power switches 26, 28 are generally provided by MOSFET devices. A non-isolated, double-ended transformer is interposed with the high-side and low-side power switches, and includes interleaved windings 12, 14, 16, and 18. Windings 12, 14 have a turns ratio of N:1 with respect to windings 16, 18. The drain terminals of the high-side power switches 22, 24 are electrically connected to the input voltage source $V_{IN}$ through respective windings 12, 14. The windings 12, 14 are arranged in parallel with opposite polarity. The source terminals of each of the high-side power switches 22, 24 are electrically connected to the drain terminals of the low-side power switches 26, 28 through respective windings 16, 18. The windings 16, 18 are arranged in parallel with opposite polarity. The source terminals of the low-side power switches 26, 28 are electrically connected to ground. A power phase node ($V_P$) is defined at the junction between the sources of the high-side power switches 22, 24 and the windings 16, 18. An output inductor 32 is connected in series between the power phase node and the load.

Figure 2:
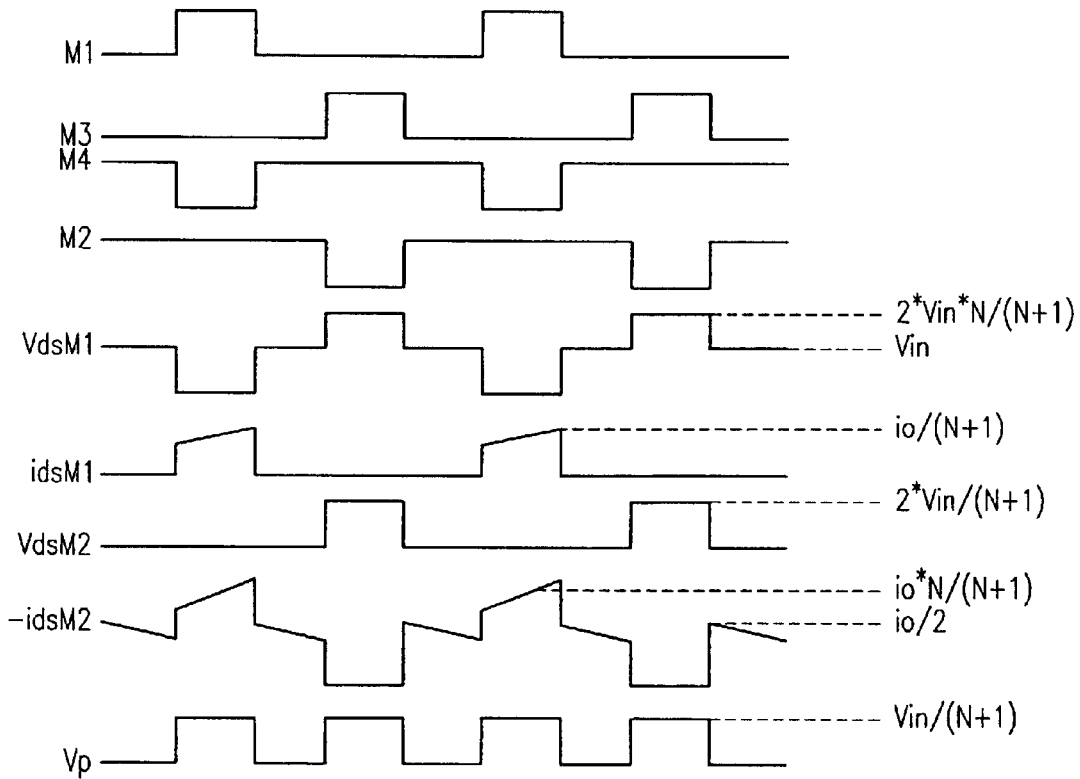
FIG. 2 is a timing diagram illustrating switch control signals and other voltage and current waveforms of the power converter of FIG. 1.

The gate terminals of the high-side and low-side power switches 22, 24, 26, 28 are connected to a control circuit (not shown), such as a pulse width modulator (PWM), that provides control signals to control the duty cycle applied to the power switches. The control signals are illustrated in FIG. 2, in which M1 is the signal applied to high-side power switch 22, M3 is the signal applied to high-side power switch 24, M2 is the signal applied to low-side power switch 26, and M4 is the signal applied to low-side power switch 28. Control signals M1 and M3 have a duty cycle of approximately 25% and have a relative phase difference of 180°. Conversely, control signals M2 and M4 have a duty cycle of approximately 75% and have a relative phase difference of 180°. FIG. 2 also illustrates other current and voltage measurements of the power converter 10 that vary in accordance with control signals, including the drain-to-source voltage across high-side power switch 22 ($V_{ds}$M1), the current from drain-to-source through high-side power switch 22 ($i_{ds}$M1), the drain-to-source voltage across low-side power switch 26 ($V_{ds}$M2), the current from drain-to-source through low-side power switch 26 ($i_{ds}$M2), and the voltage at the power phase node ($V_P$).

In a first phase of the power cycle, control signal M1 goes high while control signal M4 goes low, causing high-side power switch 22 to conduct and low-side power switch 28 to shut off. Control signal M2 is already in a high state, so low-side power switch 26 is already conducting. This causes current to flow through winding 12 and high-side power switch 22 to the load, and through low-side power switch 26 and winding 16 to the load at the same time. The ratio of current flowing through these two paths is determined by the turns ratio of the double-ended transformer. At the end of this part of the power cycle, control signal M1 goes low and control signal M4 goes high. The stops the flow of current through winding 12 and high-side power switch 22. Current continues to be delivered through windings 16 and 18 to the load as the circuit free-wheels to reset the transformer core.

Next, in a second phase of the power cycle, control signal M3 goes high while control signal M2 goes low, and a similar process occurs. Specifically, high-side power switch 24 conducts and low-side power switch 26 is shut off. Control signal M4 is already in a high state, so low-side power switch 28 is already conducting. This causes current to flow through winding 14 and high-side power switch 24 to the load, and through low-side power switch 28 and winding 18 to the load at the same time. As before, the ratio of current flowing through these two paths is determined by the turns ratio of the double-ended transformer. At the end of this part of the power cycle, control signal M3 goes low and control signal M2 goes high. This stops the flow of current through winding 14 and high-side power switch 24. Current continues to be delivered through windings 16 and 18 to the load as the circuit free-wheels to reset the transformer core.

It should be appreciated that the magnetic flux swing in the double-ended transformer is bi-directional. In other words, the transformer is being actively driven in two directions, as opposed to single-ended transformers that are driven in one direction and allowed to reset its core flux naturally. The double-ended transformer has the advantage of utilizing the core volume more efficiently, and therefore allowing the use of a physically smaller transformer core. The frequency of the voltage ripple across the output inductor 32 is twice that of the switching frequency of each individual phase. There is a linear relationship between the conversion ratio of the power converter and the duty cycle, as defined by the following equation:

$$V_{OUT}/V_{IN} = D/(N+1)$$

wherein D is the duty cycle of each phase, and N is the turns ratio of the non-isolated double ended transformer. Thus, the duty cycle can be increased proportionally with the transformer turns ratio. Moreover, the switching loss of the high-side power switches 22, 24 corresponds to $N/(N+1)^2$ that of the corresponding switching loss in a conventional buck converter.

There are many advantages of the present power converter topology. The topology achieves a true buck equivalent in that the output current is continuously delivered from the input side to the load. The double-ended transformer makes efficient use of the core volume. Substantial ripple cancellation is achieved, thereby reducing the output capacitor requirements. There is significantly reduced high-side power device switching loss, which enables the high frequency operation without thermal degradation to the high-side power devices. Lastly, the power converter topology provides fast transient response as compared with coupled inductor or flyback equivalent topologies.

Figure 3A:
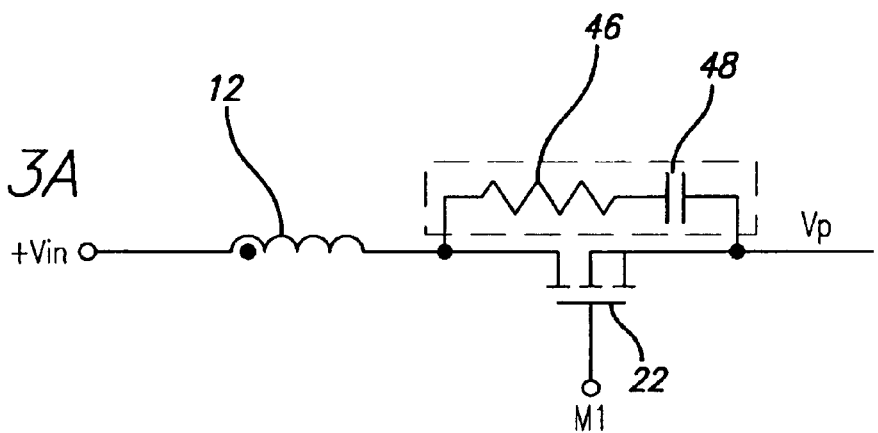
FIGS. 3A–3C are schematic diagrams of alternative snubber circuits for use with the power converter of FIG. 1.
Figure 3B:
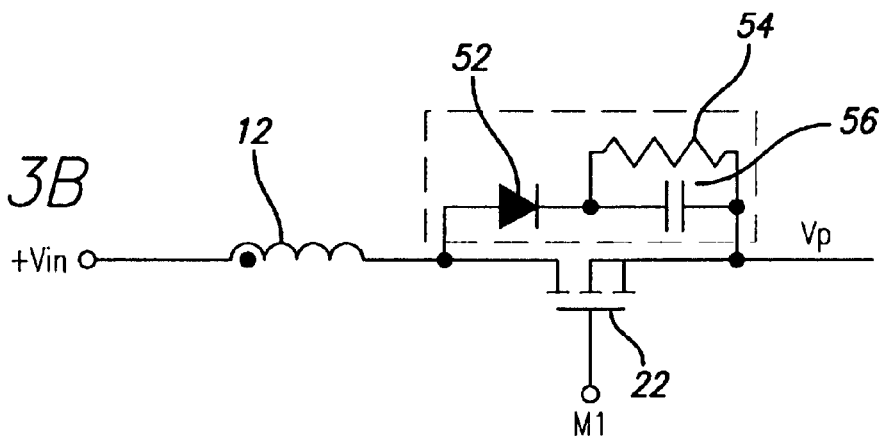
Figure 3C:
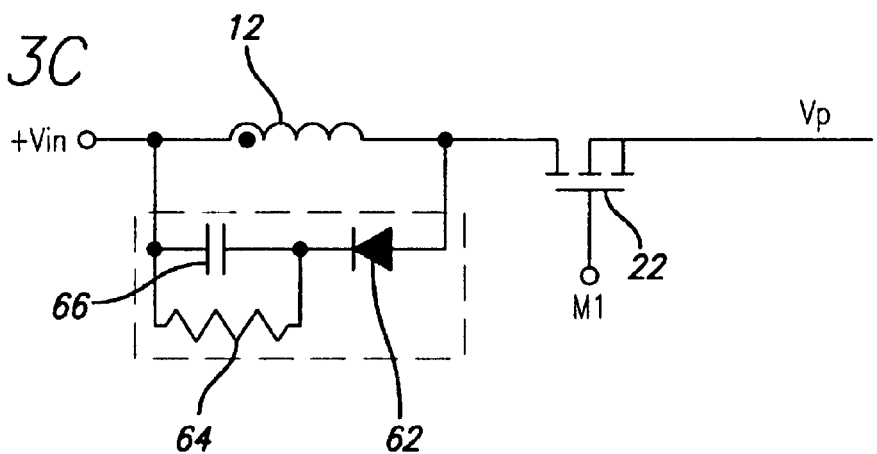

In an embodiment of the invention, the power converter 10 may further include a snubber circuit. Even though the magnitude of the ripple on the output inductor 32 is reduced by half (since the frequency is doubled), it may still be desirable to reduce the ripple further. The ripple is due to leakage inductance of the transformer that keeps current flowing through the high-side power switch 22 after the switch has shut off, resulting in voltage ringing or spikes. A snubber circuit is known to reduce these undesirable effects. FIGS. 3A–3C illustrate various exemplary embodiments of snubber circuits used in association with the power converter 10. In FIG. 3A, the snubber circuit includes a resistor 46 and capacitor 48 connected in series between the drain and source terminals of the high-side power switch 22. The resistor 46 and capacitor 48 provide a low-pass filter that dissipates the high frequency energy of the leakage inductance voltage spike. In FIG. 3B, the snubber circuit includes a diode 52 and parallel-connected resistor 54 and capacitor 56 connected in series between the drain and source terminals of the high-side power switch 22. The snubber circuit serves to slow up the voltage rise time across the high-side power switch 22. FIG. 3C shows a similar snubber circuit including a diode 62 and parallel-connected resistor 64 and capacitor 66 connected in parallel with transformer winding 12. Other snubber circuits generally known in the art could also be advantageously utilized.

As known in the art, the control circuit typically receives feedback signals that are used to regulate the output voltage ($V_{OUT}$) and output current ($i_O$). The feedback signals may include a voltage error signal and a current sense signal. The voltage error signal corresponds to a difference between the output voltage ($V_{OUT}$) and a reference, and the current sense signal corresponds to the output current ($i_O$) being delivered to the load. It is anticipated that the power converter 10 include known current sensing techniques in order to generate the current sense signal, such as a sensing resistor included in series with the output inductor or in series with the drain of the high-side power switch. The current sense signal may be derived by monitoring the voltage drop across the sensing resistor. Alternatively, a filter including a resistor and capacitor may be disposed in parallel with the output inductor so that the instantaneous voltage across the capacitor can be made equal to the voltage across the DC resistance of the inductor and thereby proportional to the instantaneous current through the output inductor. It is also known to use the on-state resistance ($R_{DSON}$) between source and drain terminals of the high-side power switches as sensing resistors.

In a preferred embodiment of the invention, a current sensor includes a filter connected to the phase node that includes the on-state resistance of both the high-side and low-side power switches. In view of the increased resistance of the current sensor, the voltage of the current sense signal is increased and thereby provides a cleaner signal referenced to the output current that is less susceptible to noise than the aforementioned conventional current sense circuits. An example of the current sensor is provided by U.S. Pat. No. 6,441,597 for "Method And Apparatus For Sensing Output Inductor Current In A DC-to-DC Power Converter," issued Aug. 27, 2002, which is incorporated by reference herein. The equivalent sense resistance of the current sensor can be expressed using the following equation:

$$R_{EQUIV} = (R_{TOP}/(N+1))D + (R_{BOT}/2)(1-D) + RL$$

wherein $R_{TOP}$ is the on-state resistance ($R_{DSON}$) of the high-side power switch plus the winding resistance of the winding in series with the high-side power switch, $R_{BOT}$ is the on-state resistance ($R_{DSON}$) of the low-side power switch plus the winding resistance of the winding in series with the low-side power switch, RL is the output inductor series resistance, and N is the non-isolated transformer turns ratio.

Figure 4:
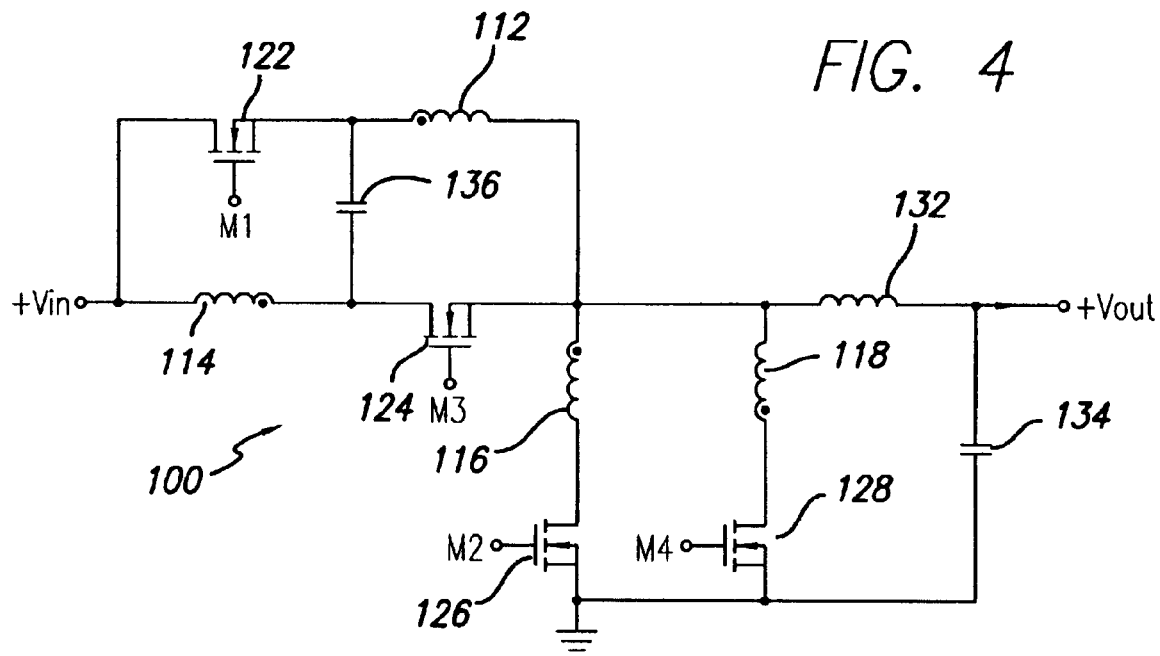
FIG. 4 is a schematic diagram of a two-phase DC-to-DC power converter having a clamping circuit in accordance with an alternative embodiment of the invention.

FIG. 4 illustrates an alternative embodiment of a two-phase DC-to-DC power converter 100 that includes a clamped topology. As in the preceding embodiment, the power converter 100 includes a pair of high-side power switches 122, 124 and a pair of low-side power switches 126, 128. A non-isolated, double-ended transformer is interposed with the high-side and low-side power switches, and includes interleaved windings 112, 114, 116, and 118. Windings 112, 114 have a turns ratio of N:1 with respect to windings 116, 118. In this embodiment, the relative position of the high-side power switch 122 and winding 112 is reversed with respect to the previous embodiment. Specifically, the drain terminal of the high-side power switch 122 is directly connected to the input voltage source $V_{IN}$ with the source terminal of high-side power switch electrically connected to the power phase node ($V_P$) through winding 112, which is in turn connected to drain terminals of the low-side power switches 126, 128 through respective windings 116, 118. The drain terminal of the high-side power switch 124 is connected to the input voltage source $V_{IN}$ through the winding 114 in the same manner as the previous embodiment. The source terminal of high-side power switch 124 is electrically connected to the power phase node ($V_P$). A capacitor 136 is connected between the source terminal of the high-side power switch 122 and the drain terminal of the high-side power switch 124.

Figure 5:
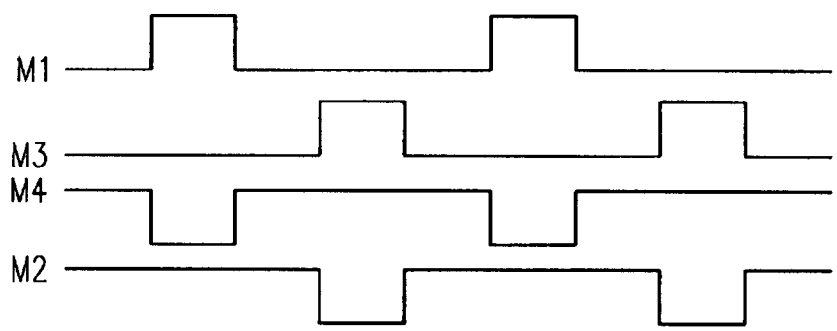
FIG. 5 is a timing diagram illustrating switch control signals for the power converter of FIG. 4.

As with the previous embodiment, the gate terminals of the high-side and low-side power switches 122, 124, 126, 128 are connected to a control circuit that provides control signals to control the duty cycle applied to the power switches. The control signals are illustrated in FIG. 5, in which M1 is the signal applied to high-side power switch 122, M3 is the signal applied to high-side power switch 124, M2 is the signal applied to low-side power switch 126, and M4 is the signal applied to low-side power switch 128. Control signals M1 and M3 have a duty cycle of approximately 25% and have a relative phase difference of 180°. Conversely, control signals M2 and M4 have a duty cycle of approximately 75% and have a relative phase difference of 180°. Since the drain terminal of the high-side power switch 122 is directly connected to the input voltage source $V_{IN}$, it will be further necessary to drive the high-side power switch 122 at a higher voltage than the other power switches, such as using a bootstrap driver as is well known in the art.

The operation of the two-phase DC-to-DC power converter 100 is substantially the same as the previous embodiment, with the following difference. When the control signal M1 goes low to shut off high-side power switch 122, current continues to flow from the winding 112 through capacitor 136 and the body diode of high-side power switch 124. Similarly, when the control signal M3 goes low to shut off high-side power switch 124, current continues to flow from the winding 114 through capacitor 136 and the winding 112. The capacitor 136 therefore provides a clamping function by preventing the voltage at the power phase node ($V_P$) from ringing.

Figure 6:
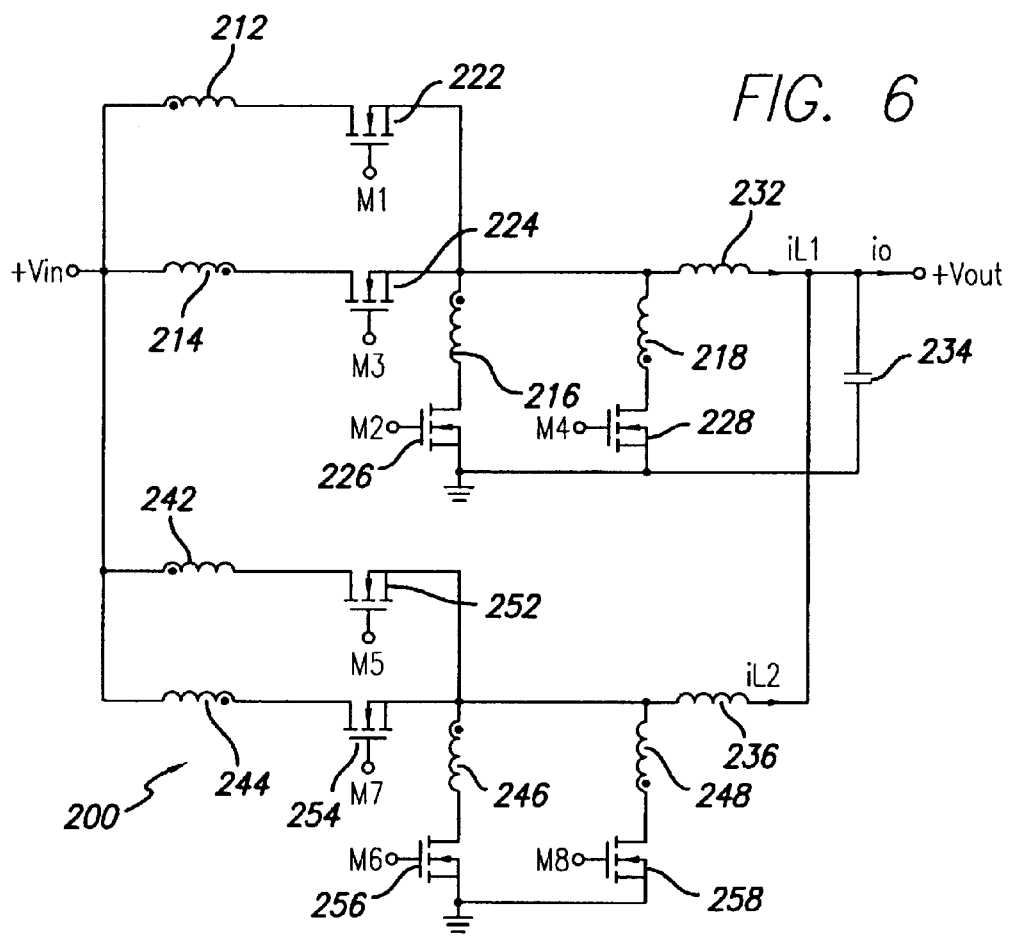
FIG. 6 is a schematic diagram of a four-phase DC-to-DC power converter in accordance with an alternative embodiment of the invention.

FIG. 6 illustrates a four-phase DC-to-DC power converter 200 in accordance with another embodiment of the invention. The DC-to-DC power converter 200 receives an input voltage ($V_{IN}$) and provides an output voltage ($V_{OUT}$) and output current ($i_O$) to a load (not shown). A capacitor 234 is electrically connected in parallel with the load to provide smoothing of the output voltage $V_{OUT}$. The power converter 200 includes a first pair of high-side power switches 222, 224, a first pair of low-side power switches 226, 228, a second pair of high-side power switches 252, 254, and a second pair of low-side power switches 256, 258. Two non-isolated, double-ended transformers are interposed with the high-side and low-side power switches. The first transformer includes interleaved windings 212, 214, 216, and 218, and the second transformer includes windings 242, 244, 246 and 248. The first transformer windings 212, 214 have a turns ratio of N:1 with respect to windings 216, 218, and the second transformer windings 242, 244 have a turns ratio of N:1 with respect to windings 246, 248.

The drain terminals of the first high-side power switches 222, 224 are electrically connected to the input voltage source $V_{IN}$ through respective windings 212, 214. The windings 212, 214 are arranged in parallel with opposite polarity. The source terminals of each of the first high-side power switches 222, 224 are electrically connected to the drain terminals of the first low-side power switches 226, 228 through respective windings 216, 218. The windings 216, 218 are arranged in parallel with opposite polarity. The source terminals of the first low-side power switches 226, 228 are electrically connected to ground. A first power phase node ($V_{P1}$) is defined at the junction between the sources of the first high-side power switches 222, 224 and the windings 216, 218. A first output inductor 232 is connected in series between the first power phase node and the load.

Likewise, the drain terminals of the second high-side power switches 252, 254 are electrically connected to the input voltage source $V_{IN}$ through respective windings 242, 244. The windings 242, 244 are arranged in parallel with opposite polarity. The source terminals of each of the second high-side power switches 252, 254 are electrically connected to the drain terminals of the second low-side power switches 256, 258 through respective windings 246, 248. The windings 246, 248 are arranged in parallel with opposite polarity. The source terminals of the second low-side power switches 256, 258 are electrically connected to ground. A second power phase node ($V_{P2}$) is defined at the junction between the sources of the second high-side power switches 252, 254 and the windings 246, 248. A second output inductor 236 is connected in series between the second power phase node and the load.

Figure 7:
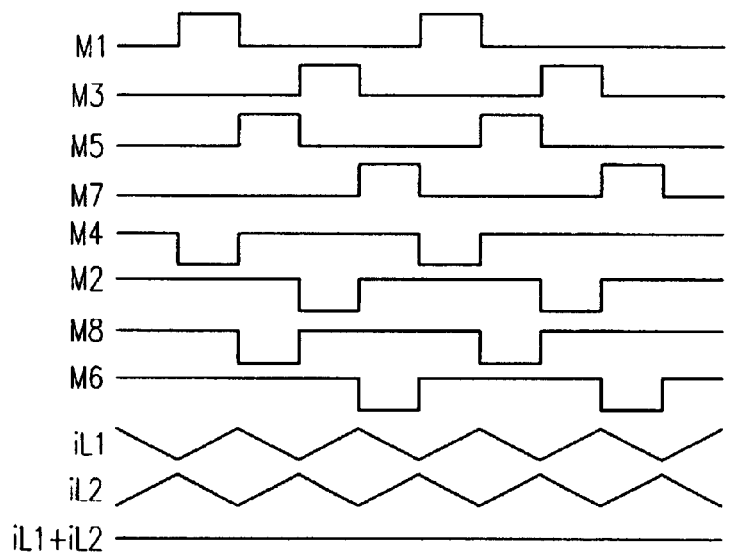
FIG. 7 is a timing diagram illustrating switch control signals and other voltage and current waveforms of the power converter of FIG. 6.

As described above, the gate terminals of the high-side and low-side power switches 222, 224, 226, 228, 252, 254, 256, 258 are connected to a control circuit that provides control signals to control the duty cycle applied to the power switches. The control signals are illustrated in FIG. 7, in which M1 is the signal applied to high-side power switch 222, M3 is the signal applied to high-side power switch 224, M2 is the signal applied to low-side power switch 226, M4 is the signal applied to low-side power switch 228, M5 is the signal applied to high-side power switch 252, M7 is the signal applied to high-side power switch 254, M6 is the signal applied to low-side power switch 256, and M8 is the signal applied to low-side power switch 258. Control signals M1 through M4 are substantially the same as described above with respect to the two-phase power converter. Control signals M5 and M7 have a duty cycle of approximately 25% and have a relative phase difference of 180°, and are shifted in phase with respect to control signals M1 and M3 by 90°, respectively. Conversely, control signals M6 and M8 have a duty cycle of approximately 75% and have a relative phase difference of 180°, and are shifted in phase with respect to control signals M2 and M4 by 90°, respectively. FIG. 7 also illustrates other current measurements of the power converter 200 that vary in accordance with control signals, including the current though first output inductor 232 (iL1) and current through second output inductor 236 (iL2). The output current ($I_O$) corresponds to the sum of iL1 and iL2, also shown in FIG. 7.

In a first phase of the power cycle, control signal M1 goes high while control signal M4 goes low, causing first high-side power switch 222 to conduct and first low-side power switch 228 to shut off. Control signal M2 is already in a high state, so first low-side power switch 226 is already conducting. This causes current to flow through winding 212 and high-side power switch 222 to the load, and through low-side power switch 226 and winding 216 to the load at the same time. The ratio of current flowing through these two paths is determined by the turns ratio of the double-ended transformer. At the end of this part of the power cycle, control signal M1 goes low and control signal M4 goes high. This stops the flow of current through winding 212 and first high-side power switch 222. Current continues to be delivered through windings 216, 218 to the load as the circuit free-wheels.

In a second phase of the power cycle, control signal M5 goes high while control signal M8 goes low, causing second high-side power switch 252 to conduct and second low-side power switch 258 to shut off. Control signal M6 is already in a high state, so second low-side power switch 256 is already conducting. This causes current to flow through winding 242 and high-side power switch 252 to the load, and through low-side power switch 256 and winding 246 to the load at the same time. The ratio of current flowing through these two paths is determined by the turns ratio of the double-ended transformer. At the end of this part of the power cycle, control signal M5 goes low and control signal M8 goes high. This stops the flow of current through winding 242 and high-side power switch 252. Current continues to be delivered through windings 246, 248 to the load as the circuit free-wheels.

In a third phase of the power cycle, control signal M3 goes high while control signal M2 goes low. First high-side power switch 224 conducts and first low-side power switch 226 is shut off. Control signal M4 is already in a high state, so first low-side power switch 228 is already conducting. This causes current to flow through winding 214 and high-side power switch 224 to the load, and through low-side power switch 228 and winding 218 to the load at the same time. As before, the ratio of current flowing through these two paths is determined by the turns ratio of the double-ended transformer. At the end of this part of the power cycle, control signal M3 goes low and control signal M2 goes high. This stops the flow of current through winding 214 and high-side power switch 224. Current continues to be delivered through windings 216, 218 to the load as the circuit free-wheels.

Lastly, in a fourth phase of the power cycle, control signal M7 goes high while control signal M6 goes low. Second high-side power switch 244 conducts and second low-side power switch 256 is shut off. Control signal M8 is already in a high state, so second low-side power switch 258 is already conducting. This causes current to flow through winding 244 and high-side power switch 254 to the load, and through low-side power switch 258 and winding 248 to the load at the same time. As before, the ratio of current flowing through these two paths is determined by the turns ratio of the doubleended transformer. At the end of this part of the power cycle, control signal M7 goes low and control signal M6 goes high. This stops the flow of current through winding 244 and high-side power switch 254. Current continues to be delivered through windings 246, 248 to the load as the circuit free-wheels.

With a per phase duty cycle of 25%, the four-phase power converter 200 provides true ripple cancellation and symmetrical transient response. It should be appreciated that the four-phase power converter 200 could further include a snubber circuit and/or current sense circuit as described above.

Figure 8:
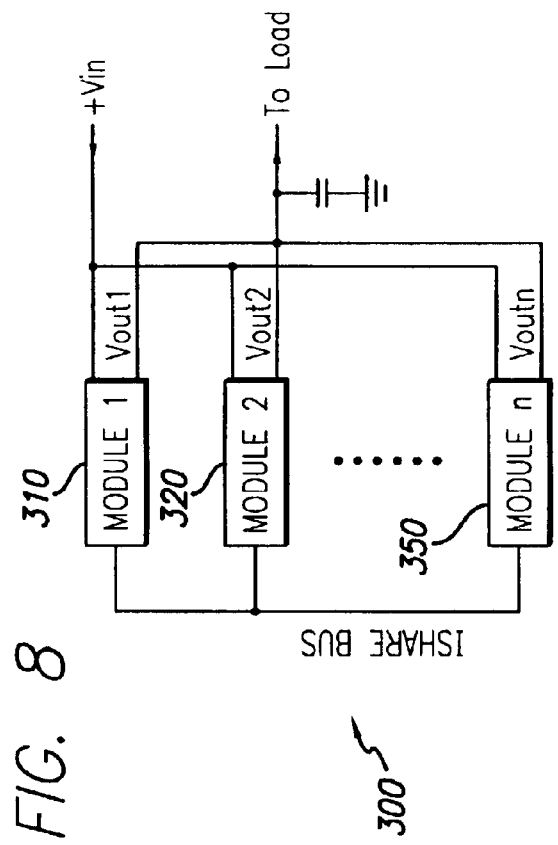
FIG. 8 is a block diagram of a multi-module power supply system in accordance with an embodiment of the invention.

FIG. 8 illustrates the present topology utilized in a multi-module power supply system 300. Modules 310, 320, 350 correspond to the two or four-phase power converters described above. Each module 310, 320, 350 receives a common input voltage ($V_{IN}$) and provides a respective output voltage ($V_{OUT1}$–$V_{OUTn}$) that is combined to supply a load (not shown). A current share bus also couples the modules 310, 320, 350, and provides a current share signal used as a feedback control signal to manage the output current delivered to the load.

Figure 9:
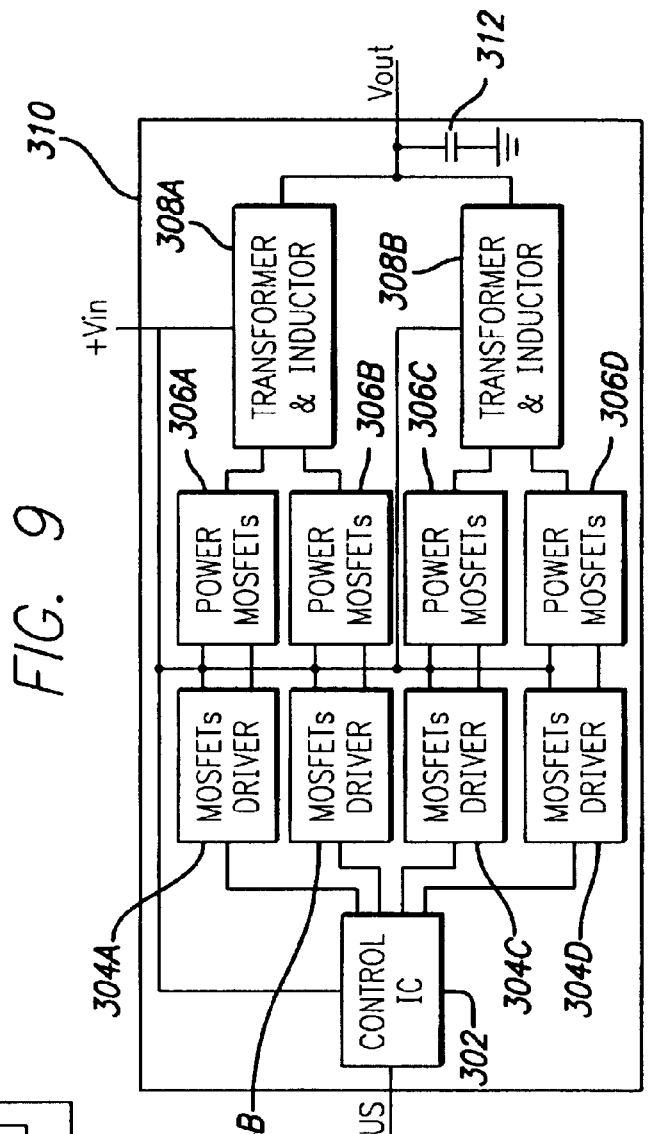
FIG. 9 is a block diagram of a single module of the multi-module power supply system of FIG. 8.

FIG. 9 illustrates one of the modules (e.g., module 310) of FIG. 8 in greater detail. The exemplary module 310 comprises a four-phase power converter as described above with respect to FIG. 6, although it should be appreciated that a two-phase or other n-phase power convert in accordance with the present invention could also be advantageously utilized. Module 310 further comprises a control integrated circuit (IC) 302 that provides timing and control signals to a plurality of MOSFET drivers 304A–304D. The MOSFET drivers 304A–304D in turn deliver control signals to respective power MOSFETs 306A–306D. The power MOSFETs 306A–306D correspond generally to the four pairs of power switches described above with respect to FIG. 6. The power MOSFETs 306A–306D are electrically connected with transformer/inductors 308A, 308B, which corresponds to the non-isolated, double-ended transformers and output inductors described above. Lastly, the module includes capacitor 312 electrically connected in parallel with the load to provide smoothing of the output voltage $V_{OUT}$.

Having thus described a preferred embodiment of a multi-phase power converter that can operate at high switching frequencies with effective ripple cancellation and reduced switching loss for high power density converter applications, it should be apparent to those skilled in the art that certain advantages of the described method and apparatus have been achieved. It should also be appreciated that various modifications, adaptations, and alternative embodiments thereof may be made within the scope and spirit of the present invention. The invention is further defined by the following claims.

What is claimed is:

1. A multiple-phase power converter, comprising:

a non-isolated, double-ended transformer having a plurality of windings;

a high-side portion including a first power switch connecting an input voltage source ($V_{IN}$) to a virtual phase node through a first winding of said plurality of windings and a second power switch connecting said input voltage source to said virtual phase node through a second winding of said plurality of windings, said first and second windings being arranged with opposite polarity;

a low-side portion including a third power switch connecting said virtual phase node to ground through a third winding of said plurality of windings and a fourth power switch connecting said virtual phase node to ground through a fourth winding of said plurality of windings, said third and fourth windings being arranged with opposite polarity;

an output portion including an output inductor connecting said virtual phase node to an output terminal providing an output voltage ($V_{OUT}$); and a controller adapted to control operations of said first, second, third and fourth power switches such that said first and second power switches are enabled in respective alternating phases, said third switch being disabled when said second switch is enabled so that current flows concurrently through both said second and fourth windings to said output inductor, and said fourth switch being disabled when said first switch is enabled so that current flows concurrently through said first and third windings to said output inductor.

2. The multiple-phase power converter of claim 1, wherein said first and second power switches are driven by respective control signals having a duty cycle of approximately 25% and a relative phase difference of 180°.

3. The multiple-phase power converter of claim 1, wherein said third and fourth power switches are driven by respective control signals having a duty cycle of approximately 75% and a relative phase difference of 180°.

4. The multiple-phase power converter of claim 1, further comprising a snubber circuit electrically connected to said high-side portion and adapted to reduce voltage ringing or spikes due to leakage inductance of said double-ended transformer.

5. The multiple-phase power converter of claim 4, wherein said snubber circuit further comprises a low pass filter electrically connected to at least one of said first and second power switches.

6. The multiple-phase power converter of claim 4, wherein said snubber circuit further comprises a diode and a parallel-connected resistor and capacitor connected electrically between drain and source terminals of each of the first and second power switches.

7. The multiple-phase power converter of claim 4, wherein said snubber circuit further comprises a diode and a parallel-connected resistor and capacitor connected electrically across each of the first and second windings.

8. The multiple-phase power converter of claim 1, further comprising a capacitor electrically connected between said first and second power switches to provide clamping of said high-side portion.

9. The multiple-phase power converter of claim 1, wherein a linear relationship is defined between a conversion ratio of the power converter and a duty cycle for driving said first and second power switches as defined by the following equation:

$$V_{OUT}/V_{IN}=D/(N+1)$$

wherein D is the duty cycle, and N is a turns ratio of said double-ended transformer.

10. The multiple-phase power converter of claim 1, further comprising a current sense circuit adapted to generate a current sense signal corresponding to output current of said power converter.

11. The multiple-phase power converter of claim 10, wherein said current sense circuit further comprises a sensing resistor included in series with said output inductor and the first and second power switches.

12. The multiple-phase power converter of claim 10, wherein said current sense circuit further comprises a filter including a resistor and capacitor disposed in parallel with said output inductor.

13. The multiple-phase power converter of claim 10, wherein said current sense circuit further comprises an on-state resistance ($R_{DSON}$) between source and drain terminals of each of said first and second switches.

14. The multiple-phase power converter of claim 10, wherein said current sense circuit further comprises a filter connected to said phase node that includes an on-state resistance ($R_{DSON}$) of each of said first, second, third and fourth power switches.

15. A multiple-phase power converter, comprising:
a first non-isolated, double-ended transformer having a plurality of windings;
a first high-side portion including a first power switch connecting an input voltage source ($V_{IN}$) to a first virtual phase node through a first winding of said first transformer and a second power switch connecting said input voltage source to said first virtual phase node through a second winding of said first transformer, said first and second windings being arranged with opposite polarity;
a first low-side portion including a third power switch connecting said first virtual phase node to ground through a third winding of said first transformer and a fourth power switch connecting said first virtual phase node to ground through a fourth winding of said first transformer, said third and fourth windings being arranged with opposite polarity;
a first output portion including a first output inductor connecting said first virtual phase node to an output terminal providing an output voltage ($V_{OUT}$);
a second non-isolated, double-ended transformer having a plurality of windings;
a second high-side portion including a first power switch connecting said input voltage source to a second virtual phase node through a first winding of said second transformer and a second power switch connecting said input voltage source to said second virtual phase node through a second winding of said second transformer, said first and second windings being arranged with opposite polarity;
a second low-side portion including a third power switch connecting said second virtual phase node to ground through a third winding of said second transformer and a fourth power switch connecting said second virtual phase node to ground through a fourth winding of said second transformer, said third and fourth windings being arranged with opposite polarity;
a second output portion including a second output inductor connecting said second virtual phase node to said output terminal providing said output voltage; and
a controller adapted to control operations of said first, second, third, fourth, power switches of said first high and low-side portions and said first, second, third, and fourth power switches of said second high and low-side portions such that said first and second power switches of said first high-side portion and said first and second power switches of said second high-side portion are enabled in respective alternating phases, said third switch of said first low-side portion being disabled when said second switch of said first high-side portion is enabled so that current flows concurrently through both said second and fourth windings of said first transformer to said output inductor, said fourth switch of said first low-side portion being disabled when said first switch of said first high-side portion is enabled so that current flows concurrently through both said first and third windings of said first transformer to said output inductor, said third switch of said second low-side portion being disabled when said second switch of said second high-side portion is enabled so that current flows concurrently through said second and fourth windings of said second transformer to said output inductor, and said fourth switch of said second low-side portion being disabled when said first switch of said second low-side portion is enabled so that current flows concurrently through said first and third windings of said second transformer to said output inductor.

16. The multiple-phase power converter of claim 15, wherein said first and second power switches of said first high-side portion and said first and second power switches of said second high-side portion are each driven by respective control signals having a duty cycle of approximately 25% and a relative phase difference of 90°.

17. The multiple-phase power converter of claim 15, wherein said third and fourth power switches of said first low-side portion and said third and fourth power switches of said second low-side portion are each driven by respective control signals having a duty cycle of approximately 75% and a relative phase difference of 90°.

18. The multiple-phase power converter of claim 15, further comprising a snubber circuit electrically connected to said first and second high-side portions and adapted to reduce voltage ringing or spikes due to leakage inductance of said first and second transformers, respectively.

19. The multiple-phase power converter of claim 15, further comprising a current sense circuit adapted to generate a current sense signal corresponding to output current of said power converter.

20. The multiple-phase power converter of claim 15, further comprising a first clamping capacitor electrically connected between said first and second power switches of said first high-side portion, and a second clamping capacitor electrically connected between said first and second power switches of said second high-side portion.

* * * * *